United States Patent [19]

Bujadoux et al.

[11] Patent Number: 5,574,116
[45] Date of Patent: Nov. 12, 1996

[54] PROCESS FOR THE PREPARATION OF A CATALYST FOR THE POLYMERIZATION OF OLEFINS

[75] Inventors: Karel Bujadoux, Lens; Jean-Michel Brusson, Lambersart; Francis Petit, Villeneuve-d' Ascq; Andre Mortreux, Hem, all of France

[73] Assignee: Nosolor, Paris-la Defense Cedex, France

[21] Appl. No.: 214,691

[22] Filed: Mar. 18, 1994

Related U.S. Application Data

[62] Division of Ser. No. 844,931, Mar. 4, 1992, Pat. No. 5,320,994, which is a continuation of Ser. No. 477,805, Feb. 22, 1990, abandoned.

[30] Foreign Application Priority Data

Jun. 23, 1988 [FR] France ................................ 88 08448
Jun. 23, 1989 [WO] WIPO ..................... PCT/FR89/00321

[51] Int. Cl.$^6$ ............................ C08F 4/654; C08F 10/00
[52] U.S. Cl. ...................... 526/116; 526/125.7; 526/144
[58] Field of Search ..................................... 526/124, 125, 526/116, 125.7, 144

[56] References Cited

U.S. PATENT DOCUMENTS

| | | | |
|---|---|---|---|
| 4,210,738 | 7/1980 | Hermans et al. | 526/351 |
| 4,252,929 | 2/1981 | Kuroda et al. | 526/125 |
| 4,371,679 | 2/1983 | Kuroda et al. | 526/125 |
| 4,529,716 | 7/1985 | Banzi et al. | 502/121 |
| 5,077,358 | 12/1991 | Durand et al. | 526/125 |

FOREIGN PATENT DOCUMENTS 841982 7/1960 United Kingdom.
1373981 11/1974 United Kingdom.

OTHER PUBLICATIONS

Boor Ziegler–Natta Catalysts and Polymerizations, Academic Press, N.Y. (1979) 602, 603, 606, 607, 608, 609.

*Primary Examiner*—Edward J. Smith
*Attorney, Agent, or Firm*—Finnegan, Henderson Farabow, Garrett & Dunner

[57] ABSTRACT

A process is disclosed for the polymerization of olefins, using (i) a catalyst and (ii) an organometallic activator from Groups I, II or III of the Periodic Table at temperatures between 20° and 250° C., and pressure up to 200 bar, in solution, or in suspension in an inert liquid hydrocarbon, at temperatures between 160° and 350° C., under pressures of between 400 and 3000 bar, in a continuous manner in a reactor where the mean residence time of the catalyst is between 1 and 150 seconds. The catalyst comprises at least one titanium compound, at least one halogen-containing organoaluminum compound and at least one inorganic magnesium compound in suspension in at least one $\alpha,\omega$-dihaloalkane. The titanium compound is essentially a titanium (III) compound, the total content of titanium (II) and titanium (IV) being less than or equal to 15% of the total content of titanium. The catalyst is obtained by a process comprising, in a first step, the reduction of a titanium (IV) compound in an $\alpha,\omega$-dihaloalkane by means of a molar excess of at least one halogen-containing organoaluminum compound, in the absence of an ether, and, in a second step, the addition to the reaction mixture of a compound which forms a magnesium halide in situ without supplementary reduction of the titanium compound obtained in the first step. Molar ratios of the $\alpha,\omega$-dihaloalkane, the titanium compound, halogen-containing organoaluminum, and the compound which forms a magnesium halide in situ are also described.

5 Claims, No Drawings

PROCESS FOR THE PREPARATION OF A CATALYST FOR THE POLYMERIZATION OF OLEFINS

This is a division of application Ser. No. 07/844,931, filed Mar. 4, 1992 now U.S. Pat. No. 5,320,994, which is a continuation of application Ser. No. 07/477,805, filed Feb. 22, 1990 now abandoned.

The present invention relates to a process for the preparation of a catalyst of the Ziegler type for the polymerization of olefines, the catalyst thus obtained and a process for polymerization of olefines using said catalyst.

The document JP-A-53/81 492 (1978) describes a solid catalyst, for the polymerization of alpha-olefines, comprising a titanium-containing solid prepared by a process comprising the liquefaction of an anhydrous magnesium halide in a halogenated hydrocarbon in the presence of aluminium halide and bringing the solution obtained into contact with an initiator in order to precipitate a solid mass, which is then, or simultaneously with its formation, brought into contact with a halogen-containing titanium compound. The aluminium halide can be obtained by reaction of a haloalkylaluminium with the chlorinated solvent. The initiator can be a halogen-containing titanium compound, an electron donor or a complex of these products. All of the examples provided in this document comprise the use of an electron donor and, moreover, the data published show that the halogen-containing titanium compound remains of valency (IV). Finally, the temperature at which the catalysts described in this document are used for polymerization is less than or equal to 120° C.

The document U.S. Pat. No. 4,366,297 teaches a process for the preparation of rubbery copolymers of olefines. The catalyst used comprises a titanium compound in the liquid state obtained by treating a titanium tetrahalide in a hydrocarbon and/or a halogenated hydrocarbon, in the presence of an ether, by means of a compound which can be an organoaluminium compound or an organomagnesium compound, used, according to the examples given, in a stoichiometric amount relative to the titanium compound. The temperature at which the catalysts described in this document are used in copolymerization to obtain amorphous copolymers is less than or equal to 120° C.

The Applicant has found that the catalysts of the previously cited documents are not stable at high temperature.

The problem posed by the present invention is to obtain, within the framework of Ziegler catalysts in suspension in a dihaloalkane, a catalyst which is stable and has good performance, that is to say leads to high yields of polymer, in particular at elevated temperature (that is to say greater than 150° C.) and enables copolymers, particularly of ethylene, robe obtained which have a structure which is at least partially crystalline and not completely amorphous. It has now been found that it is possible to obtain this type of catalyst by limited reduction of a titanium (IV) compound to a titanium (III) compound without significant formation of titanium (II) compound, while using an excess of reductant relative to titanium.

One subject of the present invention is a process for the preparation of a catalyst for the polymerization of olefines, comprising, in a first step, the reduction of a titanium (IV) compound in an α,ω-dihaloalkane by means of a molar excess of at least one halogen-containing organoaluminium compound, in the absence of an ether, characterized in that it comprises, in a second step, the addition to the reaction mixture of a compound capable of forming a magnesium halide in situ without supplementary reduction of the titanium compound obtained during the first step.

The titanium (IV) compound to be reduced advantageously has the general formula $Ti(OR)_n X_{4-n}$ in which X is a halogen, R is an alkyl radical having 1 to 10 carbon atoms and $0 \leq n \leq 4$. Titanium tetrachloride $TiCl_4$ is preferentially used.

A vanadium (III), (IV) or (V) compound can be added to the titanium (IV) compound before, during or after reduction. Its general formula is $VX_3$, $VX_4$ or $VO(OR)_m X_{3-m}$, in which formulae X is a halogen, preferably chlorine, R is an alkyl radical having 1 to 6 carbon atoms and $0 \leq m \leq 3$. Advantageously, the pentavalent vanadium compound contains at least one chlorine atom. For example, the oxytrichloride $VOCl_3$ is used for an addition before reduction and $VCl_3$ for an addition after reduction of the titanium (IV) compound.

The α,ω-dihaloalkane used as the suspending medium for the catalyst according to the invention has the general formula $X$—$(CH_2)_n$—$X'$ in which X and X', which may be identical or different, are each a halogen atom, such as chlorine, bromine and fluorine, and n is an integer between 1 and 10 and preferably between 1 and 6. The nature of the halogen atoms and the value of n are such that the α,ω-dihaloalkane will be liquid under the usual conditions of temperature and pressure. Amongst the compounds corresponding to the general formula given above, dichloromethane, 1,2-dichloroethane, 1,4-dichlorobutane and their mixtures are advantageously chosen.

The halogen-containing organoaluminium compound used to reduce the titanium (IV) compound is chosen from:

the compounds of general formula $R_n AlX_{3-n}$ in which R is an alkyl radical having 1 to 4 carbon atoms, X is a halogen and $1 \leq n \leq 2$. Dichloroethylaluminium, chlorodiethylaluminium and their mixtures may be cited for example.

the compounds of general formula $X_2 Al(CH_2)_n Alx_2$ in which X is a halogen atom and $1 \leq n \leq 8$. They can be obtained by reaction of aluminium on an α,ω-dihaloalkane. The compounds of formula $Cl_2AlCH_2AlCl_2$ and $Cl_2Al(CH_2)_2AlCl_2$ may be cited for example.

The process according to the invention can be carried out in the presence, moreover, of an inert solvent which is advantageously chosen from the saturated aliphatic or cycloaliphatic hydrocarbons which have a boiling point under atmospheric pressure, which is not lower than 60° C. The solvent can be, in particular, a saturated aliphatic or cycloaliphatic hydrocarbon having 6 to 14 carbon atoms, for example a $C_{10}$–$C_{12}$ saturated aliphatic hydrocarbon cut. The amount of inert solvent is chosen such that the catalyst obtained will be in the form of a suspension which can be handled.

The process according to the invention can also be carried out in the presence of at least one α-olefine having at least 4 carbon atoms, in order to promote the activity of the active centres of the catalyst. Advantageously, 4-methyl-pent-1-ene, hex-1-ene, oct-1-ene or dec-1-ene can be used as α-olefine, in an amount which can be up to 10 times the molar amount of the titanium (IV) compound.

A compound capable of forming a magnesium halide in situ which may be mentioned in particular is an organomagnesium derivative of formula R—Mg—R' in which R and R', which may be identical or different, are alkyl radicals having 1 to 12 carbon atoms. Advantageously, n-butylethylmagnesium or n-butyl-n-octylmagnesium or their mixtures are used.

The process according to the invention can be carried out in a stirred reactor at a temperature of between 0° and 80° C. The usual precautions are taken to prevent losses of volatile products while carrying out the process under an adequate pressure. The effect of the presence of an α,ω-dihaloalkane in the reaction mixture is to promote the reduction of the titanium (IV) compound essentially to a titanium (III) compound, while if the α,ω-dihaloalkane is absent the formation of titanium (II) compound is very significant.

The relative proportions of the various reactants used in the process according to the invention are as follows, expressed as molar ratios:

α,ω-dihaloalkane/titanium compound, and if necessary vanadium compound: advantageously between 5 and 180 and preferably between 8 and 60; halogen-containing organoaluminium compound/titanium compound, and if necessary vanadium compound; greater than 1; it is preferably less than or equal to 6;

compound capable of forming a magnesium halide in situ/titanium compound, and if necessary vanadium compound: advantageously between 1 and 15 and preferably between 1 and 6;

vanadium compound/titanium compound: advantageously less than or equal to 6, preferably less than or equal to 3 and still more preferentially between 0 and 1;

halogen-containing organoaluminium compound/compound capable of forming a magnesium halide in situ: advantageously between 0.3 and 2 and preferably between 0.5 and 1.5.

The catalyst thus obtained therefore comprises at least one titanium compound, at least one halogen-containing organoaluminium compound and at least one inorganic magnesium compound in suspension in at least one α,ω-dihaloalkane; it is characterized in that the titanium compound is essentially a titanium (III) compound, the total content of titanium (II) and titanium (IV) being less than or equal to 15% of the total content of titanium.

The catalyst may also contain all or part of the inert solvent used during its preparation (it may be desirable to partially evaporate the solvent in order to adjust the solids concentrations).

The catalyst can also contain the α-olefine used during its preparation, if necessary in the at least partially polymerized state.

The determination of the valence states of the titanium is carried out using a redox determination in 3 parts. The first part enables the content of ($Ti^{2+}+Ti^{3+}$) to be calculated; it consists in oxidizing $Ti^{2+}$ to $Ti^{3+}$ by means of protons introduced in the form of a 2N HCl solution prepared in degassed distilled water. The $Ti^{3+}$ formed plus the $Ti^{3+}$ present from the start are then oxidized to $Ti^{4+}$ using an excess of 0.2N $Fe^{3+}$ solution. $Fe^{3+}$ is reduced to $Fe^{2+}$, which is determined by potassium bichromate in a sulphuric/phosphoric medium in the presence of 0.2% sodium diphenylaminesulphonate. The amount of $Fe^{2+}$ thus determined corresponds to the $Ti^{2+}+Ti^{3+}$ ions present from the start in the catalyst. The second part enables the content of $2Ti^{2+}+Ti^{3+}$ to be calculated. It consists in oxidizing $Ti^{2+}$ and $Ti^{3+}$ by means of an excess of a solution of $Fe^{3+}$ ions in the absence of protons to prevent the oxidation of $Ti^{2+}$ to $Ti^{3+}$, according to the reactions:

$$Ti^{2+}+2Fe^{3+} \rightarrow Ti^{4+}+2Fe^{2+}$$

and $$Ti^{3+}+Fe^{3+} \rightarrow Ti^{4+}+Fe^{2+}$$

The $Fe^{2+}$ ion determination is then carried out using potassium bichromate as above. The value obtained corresponds to the sum $2Ti^{2+}+Ti^{3+}$ present in the catalyst. The third part enables the $Ti^{4+}$ content to be determined by reduction, by means of triethylaluminium according to a Al/Ti atomic ratio of 6, of titanium (IV) present to titanium (III) and titanium (II). The determination is then carried out in accordance with the first part above, the value found for $Ti^{2+}+Ti^{3+}$ corresponding to the sum $Ti^{2+}+Ti^{3+}+Ti^{4+}$ of the ions present in the catalytic compound analyzed and consequently to the total titanium content. The various percentages are calculated by solving the following system of equations:

$$Ti^{2+}+Ti^{3+}=A$$

$$2Ti^{2+}+Ti^{3+}=B$$

$$Ti^{2+}+Ti^{3+}+Ti^{4+}=C$$

Among the titanium compounds which can be present in the catalyst according to the invention, the trihalides $TiX_3$, advantageously the trichloride $TiCl_3$, may be mentioned in particular.

The catalyst according to the invention can also contain at least one vanadium compound in the form either of the trihalide $VX_3$, for example the trichloride $VCl_3$, the tetrahalide $VX_4$, for example the tetrachloride $VCl_4$, the oxytrihalide $VOX_3$, for example the oxytrichloride $VOCl_3$, or the vanadyl (halo)ester of formula $VO(OR)_nX_{3-n}$ in which X is a halogen, preferably chlorine, R is an alkyl radical having 1 to 6 carbon atoms and n is between 1 and 3. Preferably the vanadium is present in the valence state (III) and/or (IV).

The magnesium compound contained in the suspended state in the catalyst according to the invention is advantageously a magnesium halide, preferably anhydrous, for example anhydrous magnesium chloride.

The catalyst prepared according to the process of the invention can be brought into contact with, and can thus also contain, an organometallic activator from groups I to III of the periodic classification, generally at ambient temperature, with stirring.

The nature and the amount of the activator are chosen as a function of the desired performances (more or less reducing activator, catalyst possessing a high initial activity or leading to a polymer of a specific fluidity index, etc.). The amount of activator is nevertheless generally between 1 and 100 times the molar amount of transition metal compound.

The activator is advantageously chosen from the trialkylaluminiums $AlR_3$, the tetraalkylaluminoxanes RR'Al—O—AlR"R'", the monoalkylsilanolatodialkylaluminiums $RSiH_2$—O—AlR'R" and their mixtures, the alkyl radicals R, R', R", R'", which may be identical or different, having 1 to 12 carbon atoms. Triethylaluminium, tri-n-butylaluminium, tri-n-octylaluminium, tetraisobutylaluminoxane and methylsilanolatodiisobutylaluminium may be mentioned for example.

Another subject of the present invention relates to a process for the polymerization of olefines at a temperature of between 20° and 350° C. approximately in the presence of a catalyst as described above. Polymerization is understood to mean homopolymerization, in particular of ethylene, and copolymerization, in particular of ethylene and at least one α-olefine possessing 3 to 8 carbon atoms.

The polymerization process can be carried out at a temperature of between 20° and 250° C, preferably between 150° and 250° C, under a pressure of up to about 200 bar, in solution or in suspension in an inert hydrocarbon having at least 6 carbon atoms, such as a $C_{10}$–$C_{12}$ saturated aliphatic hydrocarbon cut. In this case the concentration of titanium compound in the catalyst used is preferably between 0.1 and 0.4 mole per liter.

In the case of the polymerization of ethylene, it can also be carried out in a continuous manner in a reactor in which the mean residence time of the catalyst is between 1 and 150 seconds approximately, the polymerization being carried out at a temperature of between 160° and 350° C. approximately, under a pressure of between 400 and 3000 bar approximately.

In order to modify the molecular weight of the polymer obtained and its fluidity index, the process can be carried out in the presence of up to 2 mol% of a chain transfer agent such as hydrogen. The polymerization process according to the invention enables an entire range of ethylene polymers with a density of between 0.87 and 0.97 to be obtained. The copolymerization of a gaseous flow containing 10 to 75% by weight of propylene and 90 to 25% by weight of ethylene leads to a copolymer having a density of, respectively, between 0.95 and 0.88. The copolymerization of a gaseous flow of ethylene (95 to 40% by weight) and but-1-ene (5 to 60% by weight) enables copolymers to be obtained which have a density of, respectively, between 0.95 and 0.915. A gaseous flow containing 30 to 70% by weight of ethylene and 70 to 30% by weight of hex-1-ene enables a copolymer to be obtained which has a density of, respectively, between 0.89 and 0.93. A terpolymer having a density of 0.88 to 0.915 can be obtained by terpolymerizing a gaseous flow containing, respectively, 25% to 45% by weight of ethylene and 75% to 55% by weight of a mixture of propylene and but-1-ene.

The catalysts according to the invention show a high catalytic activity during the polymerization of ethylene. By varying the nature of the activator, it is possible to obtain catalytic systems having a high initial polymerization constant and/or able to lead to polymers having a fluidity index of between 0.2 and 20 dg/min. The possibility of obtaining polymers which have a relatively low fluidity index (for example less than 1 dg/min) and are thus more particularly intended for the production of films is noted.

The aim of the examples below is to illustrate the invention in a non-limiting manner.

EXAMPLES 1 TO 10

Preparation of the catalysts

The catalysts were prepared in a glass flask fitted with a stirrer and surmounted by a condenser, under a nitrogen atmosphere. The various reactants are introduced at a rate such that the reaction mixture will be kept at a temperature of between 15° and 50° C. The preparation takes approximately one hour.

1,2-dichloroethane (termed DCE below), if necessary hex-1-ene (termed Hx below), and then 10 millimoles of $TiCl_4$ (diluted to 1 mole/liter in a $C_{10}$–$C_{12}$ saturated aliphatic hydrocarbon cut used as inert solvent) and finally dichloroethylaluminium (termed DCEA below) are introduced successively, in the molar or atomic ratio shown in Table I, into the flask, with stirring and at ambient temperature.

The mixture is stirred for 30 to 45 minutes and 100 ml of the same inert solvent and then, dropwise, n-butylethylmagnesium (BEM) are added. The temperature rises by about 40° C. The mixture is allowed to cool to ambient temperature and if necessary vanadium oxytrichloride is added. The mixture is made up with the inert solvent so as to obtain the catalyst in suspension at a titanium and vanadium concentration of 50 millimoles/liter.

TABLE I

| Example | DCE Ti + V | HX Ti + V | Al Ti + V | Mg Ti + V | V Ti |
|---|---|---|---|---|---|
| 1 | 20 | 0 | 3 | 3 | 1 |
| 2 | 20 | 2.5 | 6 | 6 | 1 |
| 3 | 20 | 3.8 | 3 | 3 | 1 |
| 4 | 40 | 7.5 | 6 | 6 | 0 |
| 5 | 8 | 1.5 | 1.2 | 1.2 | 4 |
| 6 | 20 | 3.8 | 3 | 1.5 | 1 |
| 7 | 20 | 3.8 | 1.5 | 1.5 | 1 |
| 8 | 20 | 3.8 | 1.5 | 4 | 1 |
| 9 | 10 | 3.8 | 3 | 3 | 1 |
| 10 | 10 | 3.8 | 1.5 | 1.5 | 1 |

EXAMPLE 3a (COMPARISON)

The operating method of Example 3 was repeated, replacing DCEA by tri(n-octyl)aluminium.

EXAMPLE 11

Under the experimental conditions of Example 3, vanadium oxytrichloride is introduced simultaneously with titanium tetrachloride, before the introduction of DCEA.

EXAMPLE 12

Under the experimental conditions of Example 5, vanadium oxytrichloride is introduced simultaneously with titanium tetrachloride, before the introduction of DCEA.

EXAMPLE 13

Under the experimental conditions of Example 3, 1,2-dichloroethane is replaced by dichloromethane.

EXAMPLE 14

The operating method of Example 3 was repeated, replacing BEM by BOM mole for mole.

EXAMPLE 15

The operating method of Example 3 was repeated replacing $TiCl_4$ by the n-butyl titanate mole for mole.

EXAMPLES 16 AND 17

The operating method of Example 3 was repeated replacing $VOCl_3$ by $VCl_4$ mole for mole (Example 16) or by vanadyl triisobutylate mole for mole (Example 17).

EXAMPLE 18 (COMPARISON)

The operating method of Example 4 was repeated without using 1,2-dichloroethane (that is to say DCE/Ti=0). The catalyst obtained has a titanium (II) content equal to 57% of the total titanium content, although it is only 6.5% in the case of the catalyst according to Example 4.

EXAMPLE 19 (COMPARISON)

The operating method of Example 6 was repeated without adding dichloroethylaluminium to the reaction mixture (that is to say Al/Ti+V=0).

EXAMPLES 20 TO 38

Polymerization of Ethylene at 200° C. under 6 bar

The installation comprises a stirred 1 liter autoclave reactor which is thermostat-controlled and fitted with valves for admission of the catalyst and for drawing off the polyethylene formed. The polymerization is carried out discontinuously by first introducing the catalyst and the activator and then pressurizing the autoclave with ethylene up to a pressure of 6 bar. This pressure is maintained by supplying fresh ethylene, the delivery of which is measured. After a given reaction time, the quantity Q of polyethylene formed is weighed, expressed as grams per milliatom-gram of transition metal per minute and per mole.$l^{-1}$ of ethylene in Table II below.

In all these examples the activator is a mixture of triethylaluminium (25% molar) and methylsilanolatodiisobutylaluminium (75% molar) in accordance with a Al/Ti+V atomic ratio of 15.

TABLE II

| Example | 20 | 21 | 22 | 22a | 23 | 24 | 25 |
|---|---|---|---|---|---|---|---|
| Catalyst from example no. | 1 | 2 | 3 | 3a | 4 | 5 | 6 |
| Q | 1120 | 1355 | 1410 | 770 | 1180 | 805 | 1160 |
| Example | 26 | 27 | 28 | 29 | 30 | 31 | 32 |
| Catalyst from example no. | 7 | 8 | 9 | 10 | 11 | 12 | 13 |
| Q | 1290 | 1410 | 1465 | 1180 | 1700 | 950 | 1150 |
| Example | 33 | 34 | 35 | 36 | 37 | 38 | |
| Catalyst from example no. | 14 | 15 | 16 | 17 | 18 | 19 | |
| Q | 1520 | 1300 | 1580 | 1175 | 405 | 1570 | |

EXAMPLES 22a, 37 AND 38 ARE COMPARATIVE.

EXAMPLE 39

The catalyst from Example 4 and, as activator, methylsilanolatodiisobutylaluminium alone in accordance with a Al/Ti ratio of 20 was used. Under the polymerization conditions of Examples 20 to 38, 1700 g of polyethylene were obtained per milliatom-gram of titanium per minute and per mole.$l^{-1}$ of ethylene.

EXAMPLE 40

The operating method of Example 4 was repeated using n-butyl titanate (Ti(O-nBu)$_4$) instead of TiCl$_4$. Under the polymerization conditions of Examples 20 to 38, using, as activator, methylsilanolatodiisobutylaluminium alone in accordance with a Al/Ti atomic ratio of 20, 1600 g of polyethylene were obtained per milliatom-gram of titanium per minute and per mole.$l^{-1}$ of ethylene.

EXAMPLE 41

Copolymerization of Ethylene/but-1-ene at 200° C. under 800 bar

A copolymerization of a mixture of 40% ethylene, 35% propylene and 25% but-1-ene (mol%) is carried out in an installation which operates continuously and comprises a reactor fed with monomers, using compressors, and a catalytic system, using a high-pressure pump, a separator in which the reaction mixture issuing from the reactor is admitted after letting down to 250 bar, and a hopper into which the copolymer present at the bottom of the separator is admitted after letting down to a value of about 10 bar.

The catalytic system comprises the catalyst from Example 3 and the activator triethylaluminium (25% molar) —methylsilanolatodiisobutylaluminium (75% molar), the atomic ratio of Al (from the activator) to the sum Ti+V (from the catalyst) being 20.

13.8 kg of copolymer are recovered per millimole of titanium and vanadium, the copolymer having a density of 0.884, a fluidity index (measured in accordance with ASTM standard D 1238 —condition E) of 7.3 dg/min and a degree of crystallinity (measured by X-ray diffraction) of 14%.

EXAMPLE 42

The same copolymerization is carried out under the conditions of Example 41, using the catalyst from Example 5 and the same activator.

3.74 kg of copolymer are recovered per millimole of titanium and vanadium, the copolymer having a density of 0.890, a fluidity index, measured under the same conditions, which is remarkably low and equal to 0.8 dg/min and a degree of crystallinity (measured by X-ray diffraction) of 17%.

We claim:

1. Process for the polymerization of olefins, in the presence of (i) a catalyst and (ii) at least one organometallic activator from groups I, II or III of the periodic classification, at a temperature of between 20° and 350° C., either at a temperature of between 20° and 250° C., under a pressure of up to 200 bar, in solution or in suspension in an inert liquid hydrocarbon having at least 6 carbon atoms, or at a temperature of between 160° and 350° C., under a pressure of between 400 and 3000 bar, in a continuous manner in a reactor in which the mean residence time of the catalyst is between 1 and 150 seconds;

wherein the catalyst comprises at least one titanium compound, at least one halogen-containing organoaluminum compound and at least one inorganic magnesium compound in suspension in at least one α,ω-dihaloalkane, characterized in that the titanium compound is essentially a titanium (III) compound, the total content of titanium (II) and titanium (IV) being less than or equal to 15% of the total content of titanium; and wherein the catalyst is obtained by a process comprising, in a first step, the reduction of a titanium (IV) compound in an α,ω-dihaloalkane by means of a molar excess of at least one halogen-containing organoaluminum compound, in the absence of an ether, and, in a second step, the addition to the reaction mixture of a compound which forms a magnesium halide in situ without supplementary reduction of the titanium compound obtained in the first step, wherein the molar ratio of the α,ω-dihaloalkane to the titanium compound is between 5 and 180, the molar ratio of the halogen-containing organoaluminum compound to the titanium compound is greater than 1, the molar ratio of the compound which forms a magnesium halide in situ to the titanium compound is between 1 and 15, and the molar ratio of the halogen-containing organoaluminum compound to the compound which forms a magnesium halide in situ is between 0.3 and 2.

2. Process according to claim 1, characterized in that it consists in copolymerizing ethylene with at least one α-olefin containing 3 to 8 carbon atoms, in proportions such that a gaseous flow containing 10% to 75% by weight of propylene and 90% to 25% by weight of ethylene leads to a copolymer having a density of, respectively, between 0.95 and 0.88, a gaseous flow containing 95% to 40% by weight of ethylene and 5 to 60% by weight of but-1-ene leads to a copolymer having a density of, respectively, between 0.95 and 0.915, a gaseous flow containing 30% to 70% by weight of ethylene and 70% to 30% by weight of hex-1-ene leads to a copolymer having a density of, respectively, between 0.89 and 0.93, and a gaseous flow containing 25 to 45% by weight of ethylene and 75% to 55% by weight of a mixture of propylene and but-1-ene leads to a terpolymer having a density of, respectively, between 0.88 and 0.915.

3. Process according to claim 1, wherein the compound which forms a magnesium halide in situ is chosen from organomagnesium derivatives of formula R—Mg—R', in which R and R' may be the same or different and are each alkyl radicals having 1 to 12 carbon atoms.

4. Process according to claim 1, characterized in that it further comprises the addition to the reaction mixture, before, during or after reduction of the titanium (IV) compound, of at least one vanadium compound chosen from the compounds of the formulae $VX_3$, $VX_4$ and $VO(OR)_m X_{3-m}$, in which formulae X is a halogen, R is an alkyl radical having 1 to 6 carbon atoms and $0 \leq m \leq 3$, wherein the molar ratio of the α,ω-dihaloalkane to the titanium compound and the vanadium compound is between 5 and 180, the molar ratio of the halogen-containing organoaluminum compound to the titanium compound and the vanadium compound is greater than 1, the molar ratio of the compound which forms a magnesium halide in situ to the titanium compound and the vanadium compound is between 1 and 15, the molar ratio of the vanadium compound to the titanium compound is less than or equal to 6 and the molar ratio of the halogen-containing organoaluminum compound to the compound which forms a magnesium halide in situ is between 0.3 and 2.

5. Process according to claim 4, wherein the vanadium compound is the oxytrichloride $VOCl_3$ and is added to the reaction mixture simultaneously with the titanium (IV) compound, before introduction of the halogen-containing organoaluminum compound.

* * * * *